Nov. 26, 1935.    H. SCHROEDER    2,022,325
MEANS TO BRACE CASE LADINGS
Filed Sept. 24, 1934    2 Sheets-Sheet 1
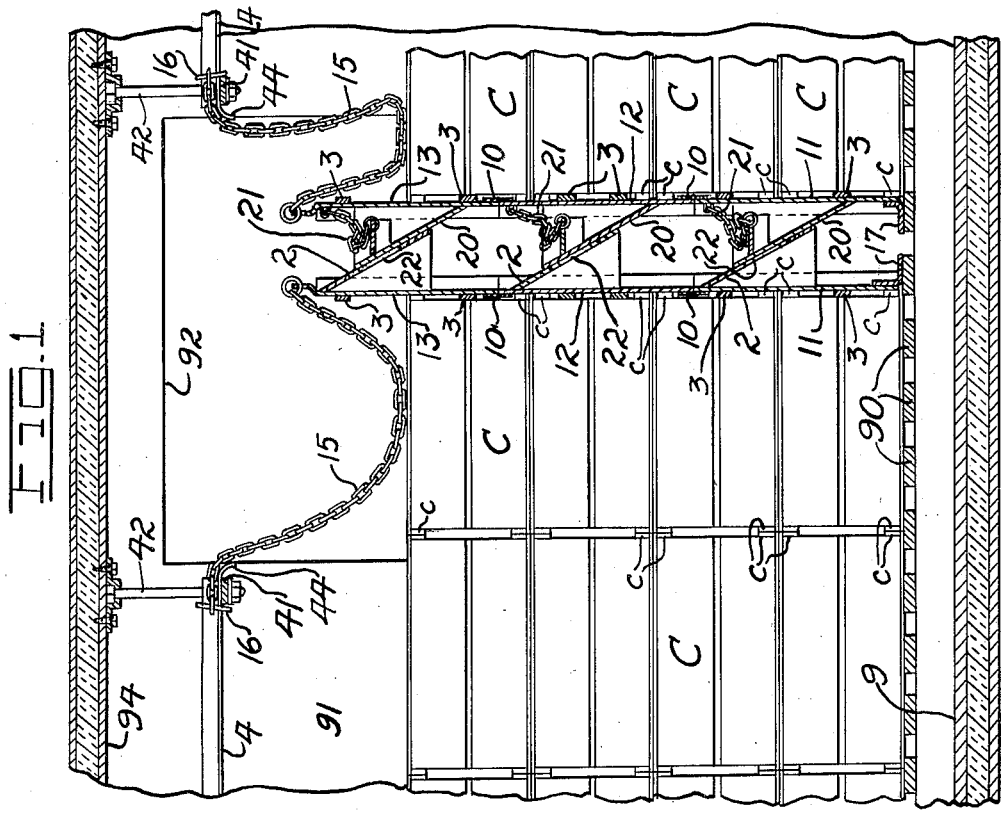
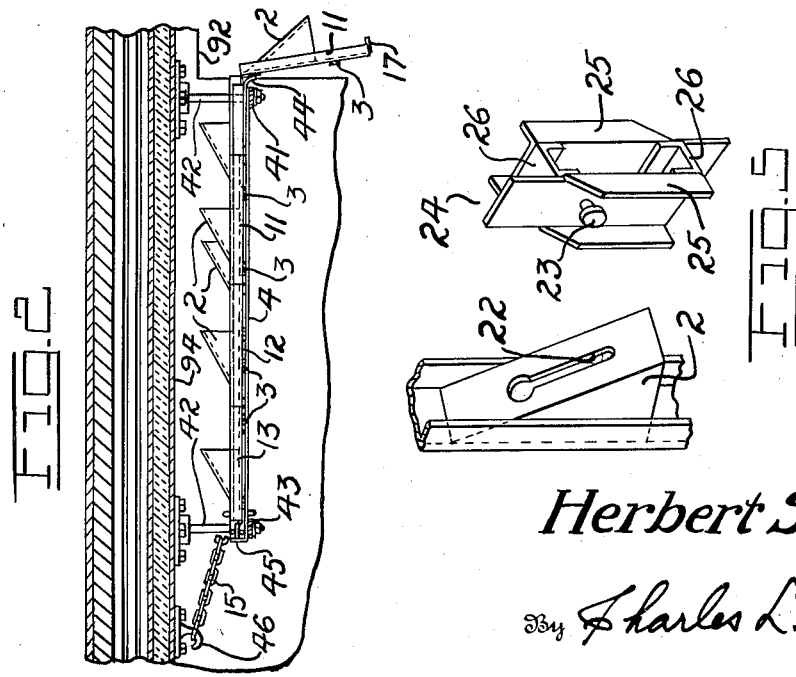
Inventor
*Herbert Schroeder*
By *Charles L. Reynolds*
Attorney

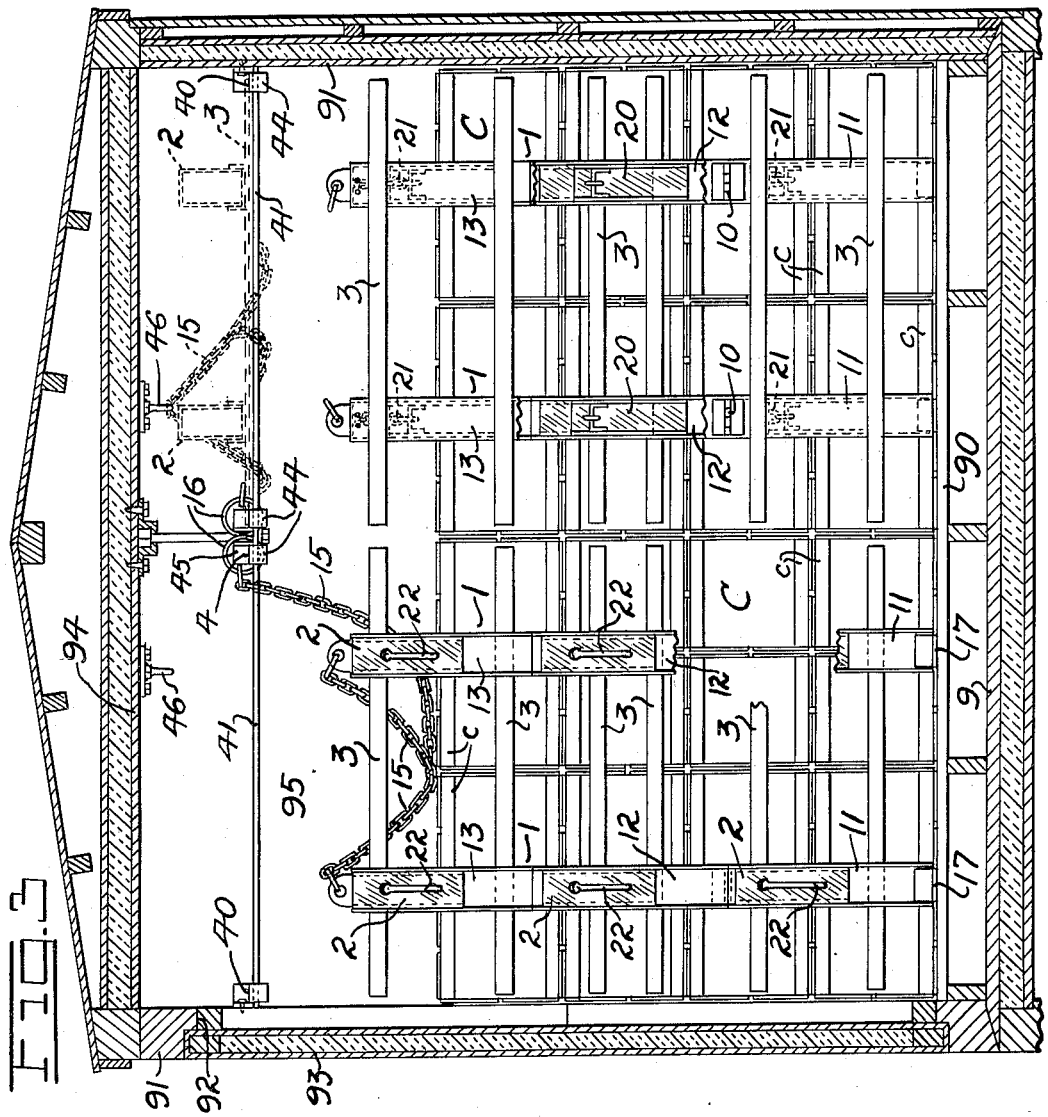
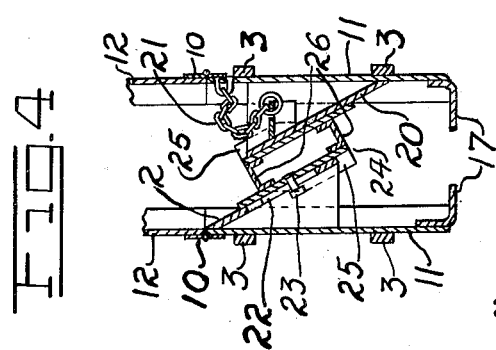

Patented Nov. 26, 1935

2,022,325

UNITED STATES PATENT OFFICE 2,022,325

MEANS TO BRACE CASE LADINGS

Herbert Schroeder, Seattle, Wash.

Application September 24, 1934, Serial No. 745,217

14 Claims. (Cl. 105—369)

My invention relates to cargo carriers, such, for example, as railway cars, and more particularly it pertains to means whereby case goods loaded within such a car or other similar cargo carrier can be braced and chocked, so that the cargo will not shift while in transit, and so that these means will automatically take up the space which is accumulated by the shifting of the cases with respect to each other, due to shocks and weaving.

Eggs are one example of cargo which is shipped in large quantities, packed in cases, the cases being loaded within refrigerator cars. It is not possible to load such cargo into a car without leaving some spacing; in consequence it is necessary to brace the two separated parts of the lading so that each such part is held tight against its respective end of the car. It is not possible to load the car so tightly that the cases will not shift longitudinally on account of shocks and rebounds while in transit.

One of the primary objects of this invention is to provide means which will adequately resist shifting of the load as a whole, and which will automatically adjust itself to proper position while in use, that is, it will take up any space gained by shifting or weaving of the cases, relative to one another. Associated with this object, it is an object to lessen materially, or to substantially eliminate, damage claims which result from failure to hold the load securely in place.

It is another object of the invention to provide bracing means for case ladings in freight cars (and the same structure might be used in bracing cargo within the hold of a vessel or in other cargo space) which will constitute a permanent part of the car itself, and will never be removed from or fail to be returned with the car, and which will not constitute freight for the shipment of which payment must be made, yet which is sufficiently flexible to accomplish the primary objects.

It is a further object, in connection with a bracing means thus permanently connected, to provide means for storing it out of the way, to enable loading the cargo or to enable the car to be used for other cargo, and in connection with this object it is a further object to provide such storage means which will support the bracing means in such a way that there is no possibility of it falling and breaking, or injuring someone in the car, or damaging cargo.

It is particularly an object of the invention to provide such bracing means which shall be strong and rugged, and which therefore has a considerable period of useful life.

It is also an object to provide such bracing means which are inexpensive and readily applied to a car.

It is sometimes desirable to use a car which normally handles eggs for hauling apples or similar products, packed into boxes, and apple boxes are slightly different in dimensions from egg cases; consequently the spacing of the two parts of the lading will not be the same when the cargo is apples as when it is eggs. Consequently it is necessary to provide brace means which are sufficiently flexible or adaptable to take care of different kinds of cargo.

With these and other objects in mind, as will appear hereafter, my invention comprises the novel parts, and the novel combination and arrangement thereof within and with respect to a cargo carrier, such as the refrigerator car shown by way of example.

In the accompanying drawings I have shown my invention in conjunction with a standard refrigerator car, and in a form which at present is preferred by me.

Figure 1 is a longitudinal vertical section of the central part of such a car, adjacent to the door, showing my invention in position of use, and Figure 2 is a similar section showing my invention stored or in process of being stored, when not in use.

Figure 3 is a transverse section through the loaded car, showing my device in position of use, but with parts broken away.

Figure 4 is a vertical sectional view of my device with a filler block in place to accommodate a greater spacing between the two parts of the cargo.

Figure 5 is a perspective view, showing the filler block and the normal chock ready to receive the filler blocks.

The refrigerator car, as shown, comprises the deck or floor 9, whereon rests a grating 90, side walls 91 having an entrance opening 92 closed by a door 93, a ceiling 94, and end walls 95. Within such a space are loaded the egg cases C which are of such dimensions that they are usually piled four or five high, eight rows across the car, and in the length of the car eight tiers in one half the car and seven tiers in the other half, bringing the intermediate tiers in front of the door opening 92. The cases will not completely and exactly fill the interior of the car. If they were of such precise dimensions as to accomplish this it would be impossible to load them this tightly. The load is therefore divided into two parts or units, with a space between each such unit, and these two units must be kept closely packed each against the adjoining end 95 of the car, so that there can be no shifting of the units as a whole or of the individual parts of such units, for any shifting is sure to cause damage in transit. However, there will be a certain amount of weaving and shifting, for it is not possible to pack such cases as tightly as they will be packed by the shocks and rebounds occurring while in transit, and the brace means employed must not be so rigid that they will not yield slightly to this weaving action, but must be so constructed and put together that they will automatically take up any slack resulting from this weaving. Metal chocks will slide somewhat relative to each other under the influence of the weaving action referred to, because of their metal surfaces, yet by reason of their weight and lessened coefficient of friction they will normally resume such a position as to brace the load, and will always take up slack, however and whenever it occurs.

The bracing means, then, preferably comprises two frames, each of which takes care of half the width of the car, cooperating with complemental frames, the one frame engaging the end of its unit of the lading at one end of the car, and the complemental frame engaging the end of its unit of the lading in the other end of the car. Thus such a frame comprises the posts, generally designated by the numeral 1, which preferably are of metal formed or bent in channel shape. Preferably, however, these posts are not one integral piece from bottom to top, but are formed of three sections, designated to distinguish them 11, 12 and 13, hingedly connected together at 10. Preferably upon each such section, but in any event spaced along the posts, are chocks 2, which may be formed of a sheet of metal bent in U shape to form a triangular chock. This is disposed between the flanges of the channel form of the post, and suitably secured to the post, as for example by welding. Two or more such posts comprise each frame, together with cross bars 3, which lie on the side of the post opposite the chocks, and which are connected to the two posts by suitable means, as for example by welding.

Care should be taken to space the cross bars and to form the length of the individual sections of the post in such a manner that there is no interference with the end cleats c, found at the top and bottom of the standard egg case. It may be found desirable that the posts be so located that each post spans the adjoining edges of two tiers of cases, and they are so located in Figure 3. Each post, so disposed, assists in supporting two rows of cases, and no row is left without the support of a post.

The frames at one end of the car are made up as described, but the frames at the opposite end are made up slightly differently. The posts and cross bars are formed as described, but the chocks, which to distinguish them are designated by the numeral 20, are formed of a size to fit between the flanges of the channeled posts, to be guided therein for vertical sliding movement, and the chocks 20 are not secured to their corresponding posts, but are slidable with respect to the posts with the first mentioned chocks 2, and when thus engaged they cannot be disengaged except by a directly vertical movement, yet they are free to slide, the metal-to-metal contact between the chocks 2 and 20, and between the edges of the chocks 20 and the corresponding post 1, preventing any friction which would make the chocks 20 stick unduly. Their weight, however, constantly urges them downward to take up any slack caused by movement of the cases, and prevents rebound, which is particularly damaging. However, these chocks 20 are permanently connected to their corresponding posts, for example by a chain 21 secured at one end to the chock 20 and at the other end to the corresponding section of its post.

Similarly each post and frame is permanently connected to the car. To this end a chain 15, terminating in a ring 16, is secured to the upper end of each post 1. The ring 16 is secured to a built-in part of the car, and preferably slides lengthwise of the car.

It is necessary that means be provided to support the rack out of the way when it is not in use, or when the car is being loaded or unloaded, and to this end I may provide racks consisting of the longitudinally extending overhead tracks 4 and 40, the tracks 4 being supported from transverse bars 41 and 43 supported in hanger rods 42, close to the ceiling 94, and the tracks 40 being secured directly to the side walls 91 of the car. One of the cross bars, 43, is located at the end of the track distant from the door opening. One end of each track is turned down, as indicated at 44, to assist in placing the frames upon the rack, and at the opposite end the track is turned up as indicated at 45, to prevent the frames sliding too far.

Since the height of a refrigerator car is not great, and it is necessary to store the racks at a sufficient height to permit men to work beneath them, these racks must be placed closely adjacent to the ceiling of the car. They may have a clearance from the ceiling somewhere in the neighborhood of twelve inches. It would be impossible in practice to handle a frame and place it upon such a rack in the restricted space permitted, when unloading a car, or to get it down from such a rack and into position between the two units of the lading, if the frames were one rigid unit. It is for this reason that the posts are formed of hingedly connected sections. Thus formed, the sections can be articulated with respect to the remainder of the frame, and placed upon or taken from the overhead racks just described, and this can be done without interference, even when the car is practically fully loaded. In Figure 2 one of the frames is shown as supported upon the rack, and another frame as partly supported upon the rack. So that there may be no danger of the frame sliding from the rack, or in any way dropping down into a position where a workman might be injured, the chain 15, the ring 16 upon which slides preferably along the track 4, is wrapped around the lowermost cross bar 3, and around the transverse supporting bar 43, thus securing the frame to the rack, and the loose end of this chain is secured to a hook 46 supported from the roof of the car, as may be seen in Figure 2 and at the right in dotted lines in Figure 3.

It should be pointed out that the posts, and therefore the frames, are supported from the deck of the car or from the grating 90 upon feet 17 somewhat curved so that they will slide readily and will not stick when engaged with the grating. Thus the frames may move under the influence of weaving, but the tendency of the comparatively heavy chocks 20 is to drop downward and to wedge the lading more securely.

To make the bracing sufficiently flexible to accommodate lading where the spacing between the two units is different, I may provide in each of the fixed chocks 2 a keyhole slot, as indicated at 22 in Figure 5, and in these keyhole slots, when required, are received headed studs 23 projecting somewhat from one face of a filler block 24, and when the filler block is supported upon the chock 2 in the manner shown in Figure 4, this in effect moves the contacting face of the chock 2 outwardly, and enables the chock 20 to engage the filler block 24 in the same manner it engaged the chock 2, yet the posts are farther spaced apart.

Such filler blocks may be formed in any suitable manner, but I have found the construction illustrated to have certain advantages. Two oppositely faced channels 25 straddle the respective chocks 2 and 20, thus preventing any transverse movement, and taking the stress off the stud 23, and these channels are spaced apart by the spacers 26, of such width as experience dictates, and permanently secured to the channels 25. The spacing of the faces of the chocks 2 and 20 is governed by the position of the stud 23 lengthwise of the keyhole slot, and by the double sliding arrangement of the block 24 relative to the chock 2, and the chock 20 relative to the block 24, a wide range of adjustment is permitted.

What I claim as my invention is:

1. Means to brace case ladings, comprising two spaced posts, adapted to be placed one against one part of the lading and the other against a part of the lading spaced from the first part, wedge means fixedly supported upon one post, complemental wedge means engageable with the first wedge means, and means interengageable between the complemental wedge means and the other post, to guide such wedge means, while in engagement with the first wedge means, for movement longitudinally of the post, to spread apart the posts and the respective parts of the lading.

2. Means to brace case ladings, comprising two posts, adapted to be placed one against a part of the lading and the other against a part of the lading spaced from the first part, and both supported in such position upon the floor and two complemental wedge means, an upwardly facing one secured to one post, and a downwardly facing one separate from but having guiding engagement with the second post for gravitational movement therealong, and when thus guided engaging the complemental wedge means to spread apart the posts and the respective parts of the lading.

3. Means to brace case ladings, comprising two upright spaced posts, adapted to bear one against one part of the lading and the other against a part of the lading spaced from the first part, upwardly facing wedge means fixedly supported upon one post, complemental downwardly facing wedge means engageable with the first wedge means, and with the other post, the latter post being of channel section and the complemental wedge means being received within such channel section for sliding movement, by gravity, downwardly along this post, thereby to spread apart the posts and the respective parts of the lading.

4. Means to brace case ladings, comprising two spaced posts, adapted to be placed one against one part of the lading and the other against a part of the lading spaced from the first part, chock means fixedly supported upon one post, complemental chock means engageable with the first chock means, means interengageable between the complemental chock means and the other post, to guide such chock means, while in engagement with the first chock means, for movement longitudinally of the post, to spread apart the posts and the respective parts of the lading, overhead supports for said posts, adapted to support the same above the deck when not in use, and flexible means permanently connecting each post to its support.

5. In a means to brace case ladings, a post adapted to bear against the lading, and formed of a plurality of hingedly connected sections, chock means carried by said post for cooperation with complemental chock means carried by a companion post, an overhead support for said post, whereon the post may be slid lengthwise, as the sections are moved relatively upon their hinges, and flexible means permanently connecting said post to its support.

6. In combination with a closed cargo carrier, means to brace case ladings comprising a frame adapted to be disposed transversely of the cargo space and incorporating cross bars and one or more upright posts, said posts being formed in sections hingedly connected, chock means carried by said frame, a rack disposed longitudinally of the cargo space and adjacent the ceiling thereof, whereon said frame may be slid longitudinally when not in use, a complemental similar frame and chock means adapted to be disposed adjacent and parallel to the first frame, each bearing against spaced parts of the lading, one of the two chock means being guided from its frame for vertical movement relative thereto, to force the frames apart, and a second similar rack for the complemental frame.

7. The combination of claim 6, the spacing of each rack from the ceiling being less than the length of the shortest post section.

8. The combination of claim 6, and flexible means securing each frame to its rack.

9. In combination with a cargo carrier, means to brace case ladings therein comprising a frame adapted to be disposed transversely of the cargo space and incorporating a plurality of cross bars and spaced upright posts, chock means carried by said frame, an overhead rack disposed longitudinally of and fixed within the cargo space, and incorporating spaced longitudinal guides to receive the ends of the cross bars and a transverse bar at one end, a ring slidable lengthwise of the rack, a chain or like flexible member connecting said ring with the frame, whereby the frame is permanently connected to the rack, and whereby the frame, when resting upon the rack, may be secured in place by wrapping the chain about said transverse bar and a cross bar of the frame.

10. A frame for the purpose described, comprising spaced upright posts, each formed of a plurality of hingedly connected sections, cross bars connecting corresponding sections of each post, a supporting foot adapted to slide on the car deck, chocks adapted to be guided in each section for vertical sliding movement, and flexible members connecting each chock to its post.

11. A frame for the purpose described, comprising spaced upright posts, each formed of a plurality of hingedly connected sections, cross bars connecting corresponding sections of each post, a supporting foot adapted to slide on the car deck, chocks secured to each section, and means associated with each chock for the support of filler blocks.

12. Means to brace case ladings, comprising two spaced posts, adapted to bear one against one part of the lading and the other against a part of the lading spaced from the first part, chock means fixedly supported upon one post, complemental chock means engageable with the first chock means, and with the other post, the latter post being of channel section and the complemental chock means being received within such channel section for sliding movement lengthwise of this post, thereby to spread apart the posts and the respective parts of the lading, a filler block having means interengageable with and slidable relative to the first chock means, in the plane of that surface which is normally engaged by the complemental chock means, and having means engaging the complemental chock means and guiding the latter for relative sliding movement.

13. Means to brace case ladings, comprising two spaced posts, adapted to be placed one against one part of the lading and the other against a part of the lading spaced from the first part, chock means fixedly supported upon one post, complemental chock means engageable with the first chock means, means interengageable between the complemental chock means and the other post, to guide such chock means, while in engagement with the first chock means, for movement longitudinally of the post, to spread apart the posts and the respective parts of the lading, a filler block straddling each of said chock means, when interposed therebetween, to prevent its lateral movement with respect thereto, and means on the filler block having supporting engagement with the first chock means, but permitting relative longitudinal movement.

14. Means to brace case ladings, comprising two members, each of a height to rest upon the floor and to extend substantially to the top of the lading, one of said members being adapted to be placed against one part of the lading, and the other member to be spaced from the first and placed against another part of the lading which is spaced from the first part, and two cooperating wedge means disposed between the two members, and one of said wedge means being free to move downward by gravity, and the other being stationary to exert a constant forcing-apart action between said two members, regardless of the spacing between them, said movable wedge means being of such weight as to overcome the friction between the same and said stationary wedge means.

HERBERT SCHROEDER.